June 14, 1927.

D. BOLZONETTI 1,632,020

COMBINED LETTER BOX AND MILK BOTTLE HOLDER

Filed March 31, 1926    2 Sheets-Sheet 2

Inventor

Decio Bolzonetti.

By Lacey & Lacey, Attorneys

Patented June 14, 1927.

1,632,020

UNITED STATES PATENT OFFICE.

DECIO BOLZONETTI, OF PITTSBURGH, PENNSYLVANIA.

COMBINED LETTER BOX AND MILK-BOTTLE HOLDER.

Application filed March 31, 1926. Serial No. 98,933.

The primary object of this invention is the provision in a single organized structure of means for receiving mail and means for receiving and securing milk bottles against theft and misappropriation when more than one family occupies a house.

A further purpose of the invention is to automatically lock the bottle when properly delivered and protect the same from insects, dust, moisture and animals and prevent unauthorized appropriation thereof. To obtain possession of the bottle the lock mechanism securing the same must be released. This can be effected only by opening the letter box, the key to which is in the possession of the owner or his representative.

The invention also relates to a novel structure of letter box which is guarded from below and which prevents tampering with the milk bottle locking mechanism, without necessitating a cumbersome, expensive and complex structure.

While the drawings illustrate a preferred embodiment of the invention it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which—

Figure 1:
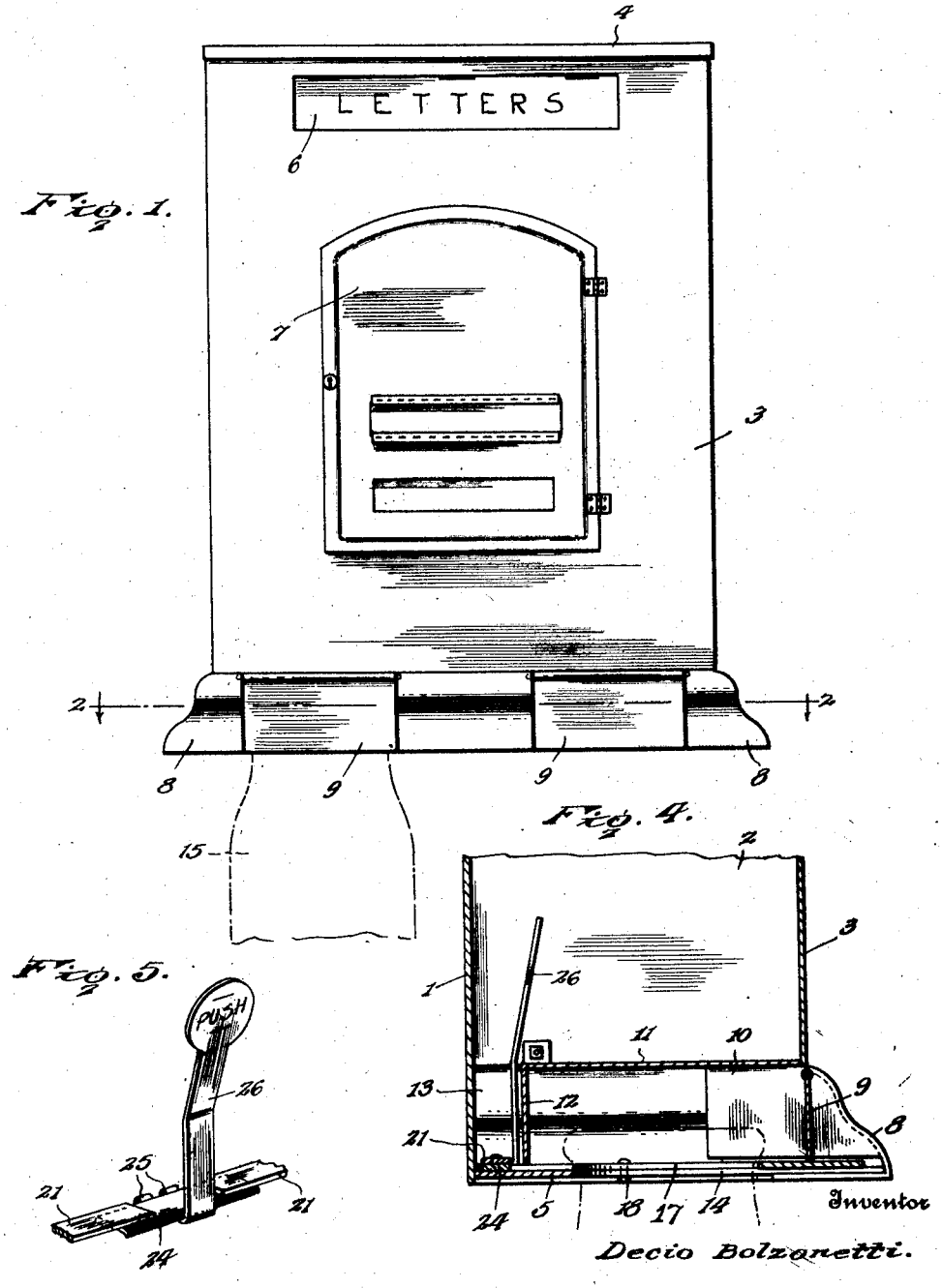

Figure 1 is a front view of a combined letter box and milk bottle holder, embodying the invention, the dotted lines indicating the upper portion of the milk bottle in position.

Figure 2:
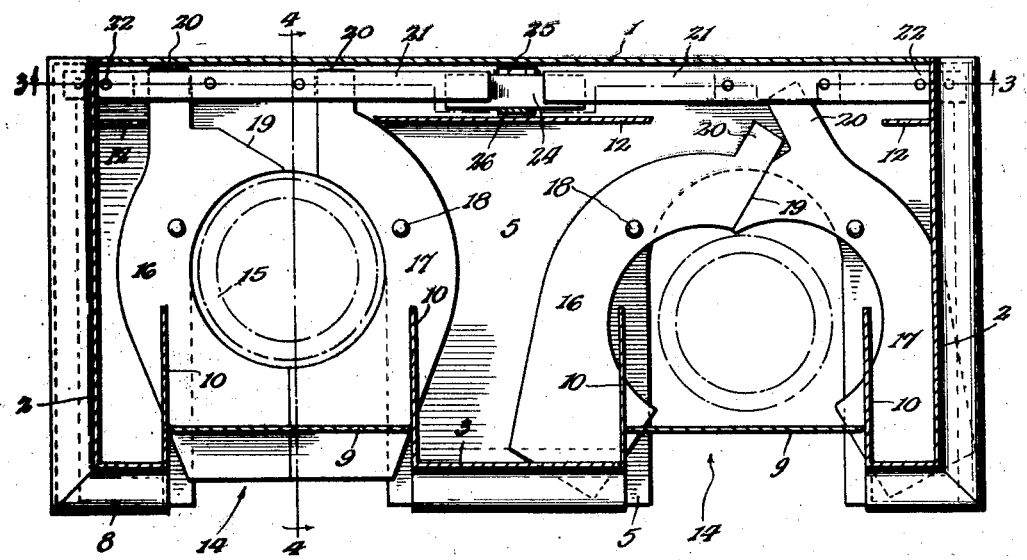
Figure 3:
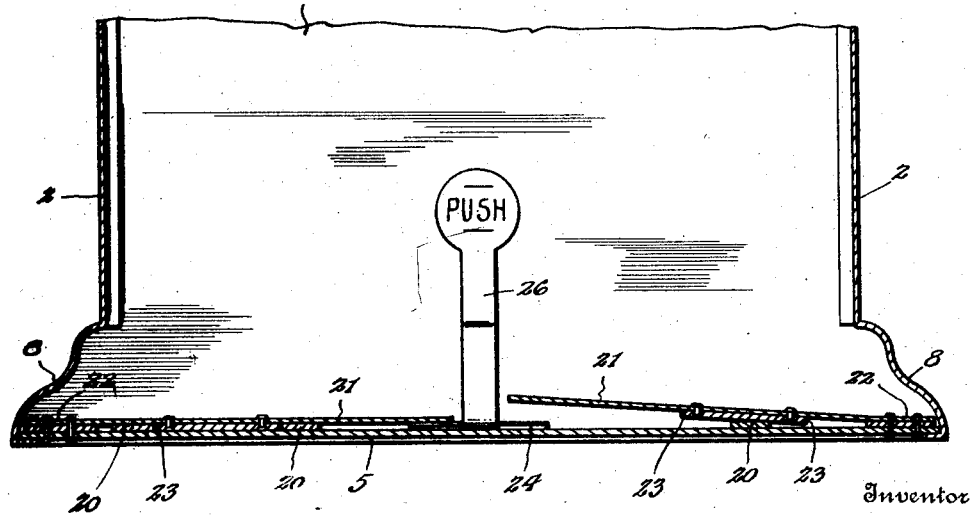

Figure 2 is an enlarged plan sectional view on the line 2—2 of Figure 1, one set of jaws being closed and locked and the other set of jaws being in open position, Figure 3 is a detail sectional view on the line 3—3 of Figure 2, looking towards the rear, as designated by the arrows, Figure 4 is a detail sectional view on the line 4—4 of Figure 2, looking in the direction of the arrows, and Figure 5 is a detail perspective view of the means for releasing the bottle gripping jaws.

Corresponding and like parts are referred to in the following description and designated in the several views of the drawings, by like reference characters.

The box for receiving the mail may be of any construction, size and material and comprises a back 1, sides 2, front 3, top 4, and bottom 5. The front 3 of the box is provided adjacent its top with the usual letter slip opening 6 and is further provided with an opening which is closed by means of a door 7 to which is fitted a key operated lock of any approved type. The lower portion of the front 3 and sides 2 of the box is flared to provide a finished appearance, represented by a molding 8. The molding 8 at the front has portions cut away to provide openings for the ingress and the egress of milk bottles and these openings are closed by doors 9 which are hinged at their tops to swing inwardly and outwardly at their lower ends. Plates 10 are located upon opposite sides of the openings closed by the doors 9 and form guards to prevent insects from entering the openings when the doors 9 swing inward. A false bottom 11 parallels the bottom 5 and is located above the guards 10 and in line with the openings closed by the doors 9. A depending portion 12 at the rear of the false bottom 11 and forming a part thereof extends downwardly and touches the bottom 5, forming a space 13 which receives the locking means for the jaws and the means for releasing the jaw locking means when it is desired to remove the milk bottle. The space 13 is formed between the lower portion of the back 1 and the depending portion 12 of the false bottom 11.

The bottom 5 is cut away at two places to provide openings 14 for receiving the neck portion of a milk bottle. The inner ends of the openings 14 are made round, as shown most clearly in Figure 2, to conform to the neck portion of a milk bottle and the width of the openings 14 corresponds to the diameter of the neck portion of the milk bottle to receive the same and prevent any appreciable side play. The guard plates 10 are disposed at the sides of the respective openings 14 and are set outwardly from the edges of the openings 14 a short distance to provide ample clearance for the mouth of the bottle which is enlarged and projects beyond the sides of the bottle neck. Jaws 16 and 17 are located upon opposite sides of each of the openings 14 and are pivoted intermediate their ends to the bottom 5, as indicated at 18, and these jaws are curved throughout their length to snugly embrace the necks of the bottles when closed about the same, as indicated most clearly in Figure 2. One of the jaws, as 16, has its rear end cut away, as indicated at 19, to provide for opening of the jaws, as indicated to the right in Figure 2. Each of the jaws 16 and 17 has a rear projection 20 which extends into the space 13 and through the cut away portion of the depending portion 12 of the false bottom 11.

A lock is associated with each pair of jaws 16 and 17 and consists of a spring 21 which is secured at one end to the bottom, as indicated at 22 and provided with stops 23 to engage the projection 20 and prevent opening of the jaws when the same are closed. The springs 21 are attached at their outer ends to the bottom 5 and their inner ends are spaced apart and overhang the part 24 of a releasing device. The stops 23 may be provided in any manner and, as shown a strip is secured to the under side of the springs 21, the ends of the strip providing shoulders or stops. The releasing device consists of a plate or strip 24 pivoted at its outer edge to the bottom 5, as indicated at 25, and a lever 26 projecting upwardly from the inner end of the plate beyond the false bottom 11 so as to be readily accessible from the interior of the box when the door 7 is open. The plate or strip 24 has opposite end portions underlapping the inner ends of the springs 21 and when the upper end of the lever 26 is pressed rearward the plate 24 is tilted and lifts the inner ends of the springs 21 whereby the stops or shoulders 23 are elevated and clear the projections 20 of the jaws which are free to turn when the bottle 15 is gripped and drawn forward. This movement causes the jaws 16 and 17 to assume the position shown to the right in Figure 2 with their rear ends forward of the inner rear end of the opening 14, so that when placing a bottle in position and exerting pressure thereon the rear ends of the jaws are forced rearwardly, thereby causing the jaws to turn about their pivot connections 18 and close about the neck of the milk bottle, as indicated to the left in Figure 2. One of the projections 20 is positioned so as to engage under the springs 21 at all times, as indicated most clearly in Figure 2 and when the jaws are open this projection 20 extends beneath the strip, the ends of which form the shoulders or stops 23. When the jaws close the projections 20 clear the stops or shoulders 23 which engage the said projections 20 and prevent opening of the jaws until released by lifting the springs 21 by means of the releasing device. It is observed that both sets of jaws are simultaneously released, so that in the event of two milk bottles being delivered, both are released at the same time. The false bottom 11 and the part 12 constitute guards to prevent any one from reaching the contents of the letter box from below through the openings closed by the doors 9 or the openings 14. The guard 12 also prevents anyone from reaching the springs 21 to effect a release of the jaws in an attempt to obtain a milk bottle after the same has been delivered.

It will be understood from the foregoing that the invention provides in a single structure means for receiving mail and for the safe delivery of milk or other commodity dispensed in bottles or like containers. Access to the lever 26 can be had only upon the opening of the door 7 of the letter box and since said door is locked unauthorized access to the box is prevented. When the device is set to receive one or more milk bottles, the jaws are released and occupy an open position, as indicated to the right in Figure 2, and upon delivering a milk bottle the same is arranged so that the neck is caused to enter the opening 14 and when the bottle is pressed rearward in the opening 14 and engages the rear ends of the jaws the latter are caused to turn and close about the neck of the bottle, as indicated to the right in Figure 2. When this takes place, the projections 20 clear the stops or shoulders 23 which are pressed downward and engage the projections 20 and prevent opening of the jaws until the same are released by pressing upon the lever 26 in the manner stated.

It is observed that the bottle is protected from insects, dust and the like since the upper portion is completely enclosed. It is also observed that the letter box cannot be rifled from below and the lock mechanism for the doors is also protected so that tampering therewith is prevented. The jaws are automatic in opening and closing, being actuated by the milk bottle which operates to close the jaws when the bottle is placed in position in the holder, and to open the jaws after the latter has been released and the bottle is grasped and drawn forwardly through the opening 14.

Having thus described the invention, I claim:

1. An article holder comprising a member having an article receiving opening, jaws disposed upon opposite sides of the article receiving opening and pivoted intermediate their ends and having rear projections, a lock spring, disposed to overlie the projections of the jaws when closed, fast at one end and movable at the opposite end and having stops to come between and engage the projections of the jaws and secure the latter when closed and a pivoted release comprising a portion underlapping the free end of the lock spring, and a lever which when operated lifts the lock spring to withdraw the stops from between the rear projections of the jaws.

2. An article holder comprising a member having an outwardly facing article receiving opening, laterally movable jaws supported upon the member and adapted to close the entrance to the said article receiving opening, vertical guides at the sides of the article receiving opening disposed above and contiguous to the forward ends of the jaws, a door arranged between the guides above the entrance to the article receiving opening and hinged to swing freely in and out at its lower end, a lock for the jaws, and lock releasing means associated with the lock.

3. A box, provided with a door controlled opening having a lock associated therewith, said box having a false bottom disposed above the main bottom and an enclosed space in the rear, the bottom of the box having an article receiving opening, jaws upon opposite sides of the article receiving opening and pivoted intermediate their ends and having rear projections extending into the said rear space, a lock located in the said rear space and adapted to coact with the rear projections of the jaws and lock releasing means likewise disposed within the said rear space and having a portion extending above the said false bottom and accessible only from the interior of the box.

4. In combination with a box having an article receiving opening in its bottom, and an elevated false bottom with a depending portion at its inner end forming a rear space, guards upon opposite sides of said opening, jaws pivoted intermediate their ends to the bottom of the box and having rear projections, a spring disposed within said rear space and connected at one end to the bottom of the box and having stops to engage the rear projections of the jaws and lock the latter when closed, and a lock releasing device having a portion extending above the false bottom and accessible from the interior of the box and adapted to engage and move the free end of said spring to disengage the stops thereof from the rear projections of the jaws.

5. In combination with a box having a pair of article receiving openings, and having a false bottom above the main bottom and an enclosed space in the rear of the false bottom, article gripping jaws pivoted intermediate their ends to the bottom of the box upon opposite sides of the respective openings, having rear projections extending into the said rear space, springs fast at their outer ends to the bottom of the box and free at their inner ends, each of the springs provided with stops to engage the rear projections of the respective jaws, and a plate hinged at one edge and underlapping the inner ends of the springs and provided at its opposite edge with an upwardly extending lever projecting above the false bottom and accessible from the interior of the box.

In testimony whereof I affix my signature.

DECIO BOLZONETTI. [L. S.]